Nov. 15, 1955 R. L. MARTIN 2,723,804
STATOR WINDING MACHINE
Filed Oct. 10, 1951 3 Sheets-Sheet 2
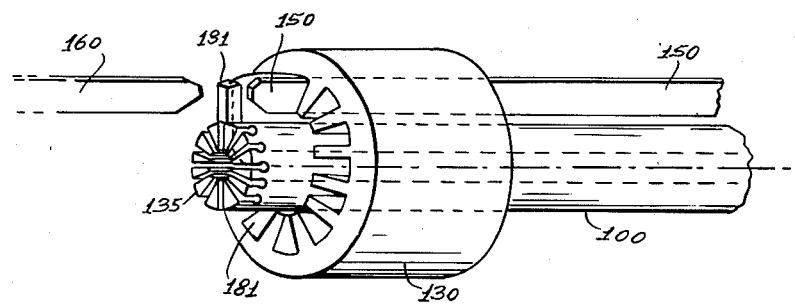
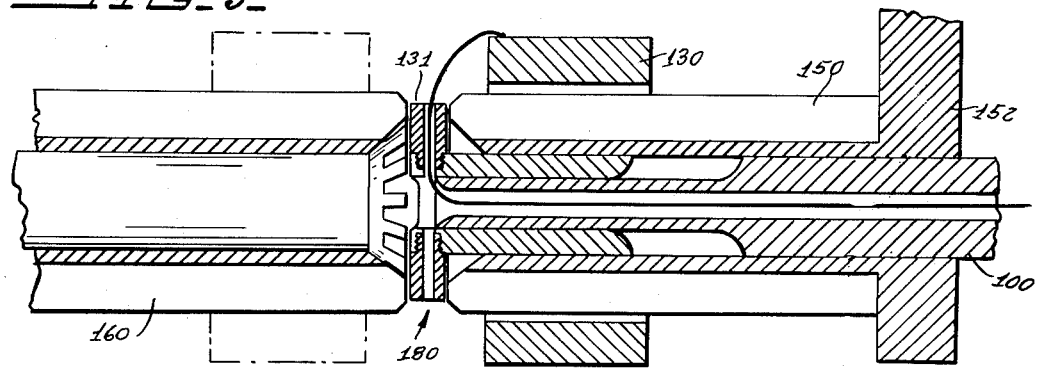
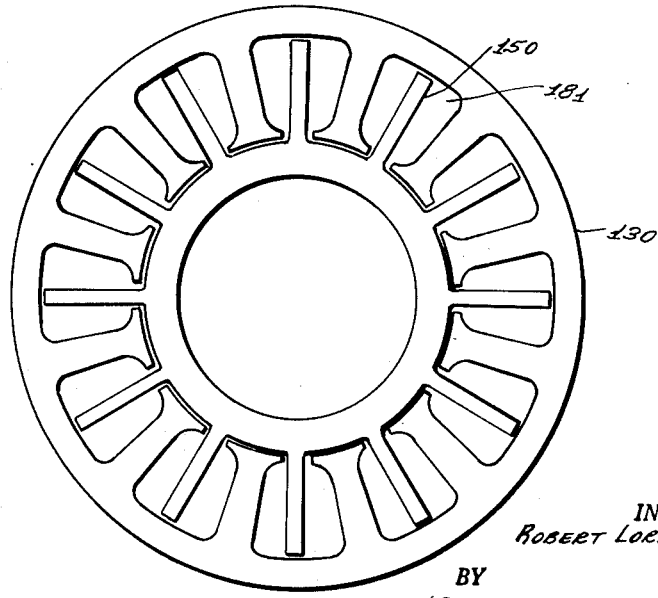
INVENTOR.
ROBERT LORING MARTIN
BY
Ostrolenk & Faber
ATTORNEYS Nov. 15, 1955  R. L. MARTIN  2,723,804
STATOR WINDING MACHINE
Filed Oct. 10, 1951  3 Sheets-Sheet 3

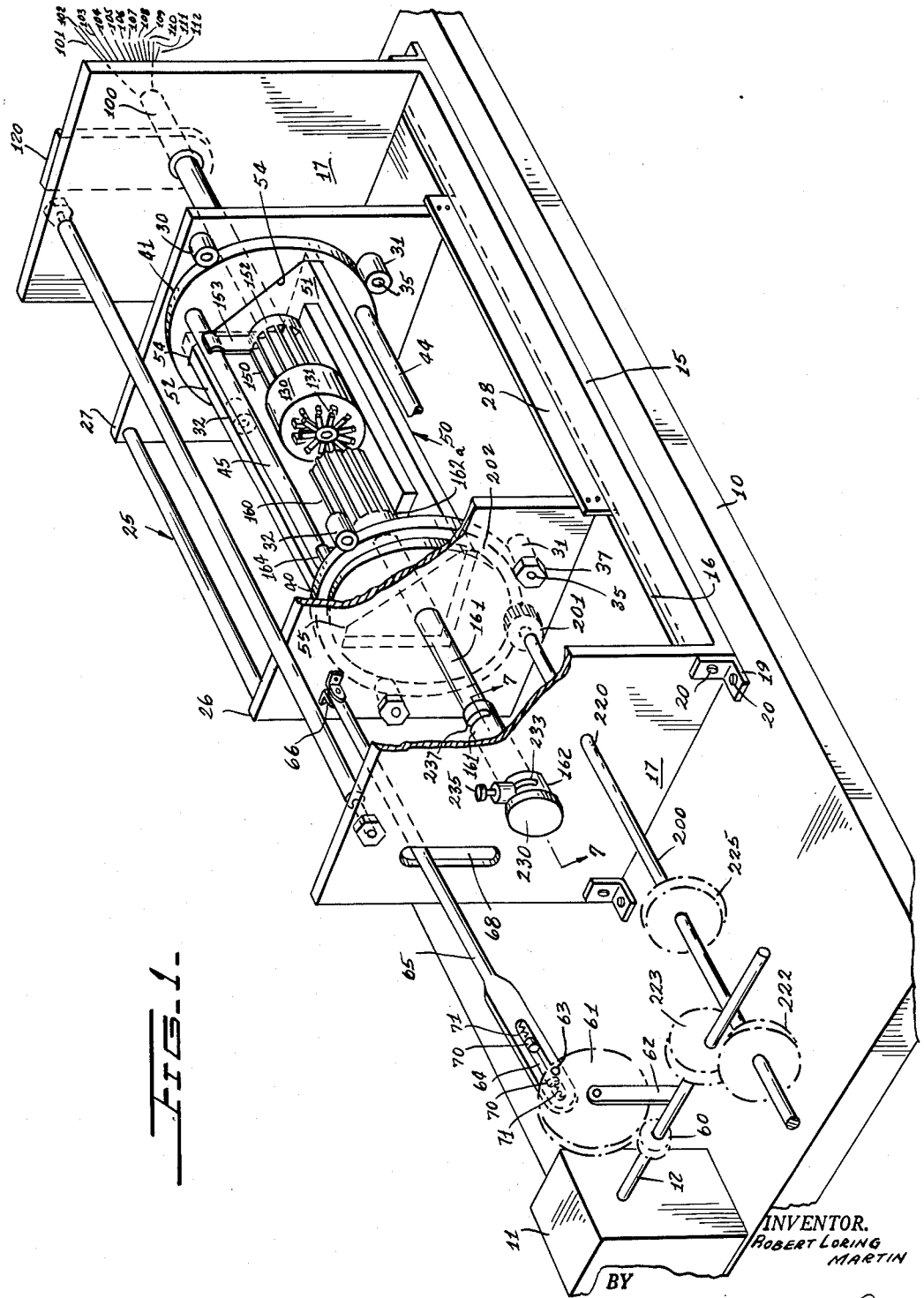

INVENTOR
ROBERT LORING MARTIN
BY
Ostrolenk & Faber
ATTORNEYS

United States Patent Office 2,723,804
Patented Nov. 15, 1955

2,723,804

STATOR WINDING MACHINE

Robert Loring Martin, Whittier, Calif., assignor to Standard Coil Products Co., Inc., Los Angeles, Calif., a corporation of Illinois Application October 10, 1951, Serial No. 250,768

2 Claims. (Cl. 242—1)

My present invention relates to a toroidal coil winding machine and more specifically to an automatic device adapted to wind a plurality of toroidal coils on the stator of a synchro wherein the coils are not overlapped slightly as has previously been the case with hand winding but wherein all of the coils are symmetrical and interengaged turn for turn owing to the simultaneous winding thereof.

Heretofore in the manufacture of synchros, it has been thought necessary that hand winding operations be used, particularly in the winding of the toroidal coils on the stator. For this purpose a plurality of coils were first wound and then inserted by hand in the stator frame with each coil overlapping the other bodily. One side of the initial coils was left open as the other side of these initial coils was pushed in and then all of the succeeding coils were pushed in position until the last coils were inserted whereupon the open or uninserted ends of the initial coils were successively put in place.

More specifically, and taking by way of example a two-pole three-phase synchro in which the stator requires twelve coils and in which case the stator frame is provided with twelve retaining slots for the coils, the coils are wound in pairs of two. An appropriate machine forms the coils with the proper number of turns on the proper size form in pairs.

Then when the coils were inserted by hand, one side only of the first three coils was placed in the appropriate slot. Thereafter the fourth coil had both sides thereof inserted in the appropriate slots, each of the coils spanning four of the slots. Thereafter successive coils could be placed in their slots until all twelve coils were inserted. When the final coil was inserted, then the first three coils were pressed back into place over the end coils.

In addition to the considerable time that hand formation of the stator windings consumed, it was also necessary to wind the coils separately which further increased the time involved. Also, since the operations were performed by hand, there was a distinct possibility of lack of symmetry owing to misplaced widings and particularly owing to the difficulty encountered by the operator in inserting windings in small slots.

Also, the possibility frequently arose that a coil was reversed at the time the coil was inserted and if this were not discovered at the time of insertion, then the takedown and repair of the synchro-stator would require as much time as the entire formation of the winding.

It is essential in the construction and operation of synchros to maintain as close a symmetry as possible, and any additional twisting or bending of the wires or any even slight misplacement of the wires will make the coil unsymmetrical and thereby greatly diminish the accuracy of the finished unit.

The primary object of my invention is the provision of a novel method and means for winding a synchro-stator automatically so that a plurality of groups of wires from an appropriate source such as a spool for each wire may be the operation of my novel method and device be formed into symmetrical coils appropriately wound and accurately spaced on a stator frame to produce an accurate and complete stator for a synchro.

A further object of my invention is the provision of novel means for winding all of the coils automatically on a synchro-stator simultaneously to produce a complete symmetry and appropriate interleaving of all of the coils. By interlacing the turns of the coils in this way, complete symmetry is produced.

In carrying out my invention, I provide a carriage adapted to receive the synchro frame and arranged to move or translate longitudinally in the direction of the axis of the synchro frame. The carriage is also arranged so that it may rotate angularly or rather oscillate back and forth angularly around the axis of the synchro frame.

A plurality of support fingers are provided individual to each of the slots of the synchro frame, two such sets of support fingers being provided on each side of a gap. These support fingers are stationary, and the carriage may slide back and forth with respect to the support fingers, the support fingers extending parallel to and radiating from a line which is an extension of the axis of the stator frame.

The gap between the two adjacent sets of fingers is provided with what I have termed a needle, actually a plurality of small arms extending radially from a line through the axis of the stator frame, each having a small opening at the end thereof. These needles or small arms are supported on a central hollow shaft or wire passage extending along the aforementioned axis inside one set of fingers up to the gap between the two sets of fingers.

Each of the openings in each of the needles communicates with this hollow shaft. The wires which are to be wound on the stator frame are led from an appropriate source, such as a plurality of spools, through this hollow shaft and up through these needles. The wires are secured in any appropriate manner to the outside of the stator in order to fix them with respect to the stator.

Assume now that at the inception of the operation the stator is on one set of fingers, say to the right of the gap between the two sets of fingers and, therefore, somewhat to the right of the set of needles.

Now, when the carriage is pulled toward the left moving the stator with it while the fingers remain stationary, the wires are pulled out by the stator from the needles which also remain stationary, the wires being thereby drawn from the spool under appropriate tension as determined by any appropriate tensioning arrangement provided between the spool and the apparatus.

When the stator moves fully to the left of the gap onto the set of fingers to the left of the gap, the needles are now on the right side of the stator. My carriage will now be rotated 90°, the wires thereby being further drawn to the needles but instead of being drawn through the slots of the stator are now being drawn around the finger circumferentially of the axis of the stator.

Where a single turn is to span four slots and twelve slots are provided in the stator, then this rotation is for 90°, at which time the rotation is halted. Now the stator on its carriage is drawn back to the left with the fingers and the needles remaining stationary. The wires are, therefore, each drawn through a slot 90° displaced from the original slot until the stator is once more to the right of the gap.

Once more the carriage is rotated 90°, this time in a reverse direction from the first rotation, and the carriage and stator are then translated axially once more to complete the turn. This process is repeated until the appropriate number of turns are wound.

The stator is then removed from the carriage with a completely symmetrical set of coils wound thereon. The wire ends are cut. A new stator is placed on the carriage. The wire ends are secured thereto, and the process is repeated. Thus, the carriage and stator will have translatory as well as angular motion, each of these operations reversing itself alternately.

The fingers which support the stator and guide it at all times and in addition support the turns of wire during winding will have angular motion with the carriage but will not have translatory or axial motion. The needles will be stationary both angularly and translatorily at all times.

Thus, by this means a simplified operation is provided for symmetrically winding the stator of a synchro.

The foregoing and many other objects of my invention will become apparent from the following description and drawings in which:

Figure 1 is a schematic perspective view showing the operation of my invention.

Figure 2 is a schematic view showing the manner in which one pair of fingers and needle cooperate with the stator slots.

Figure 3 is a cross-sectional view through the stator and fingers showing the manner in which these elements cooperate.

Figure 4 is a transverse cross-sectional view through the stator.

Figure 5:
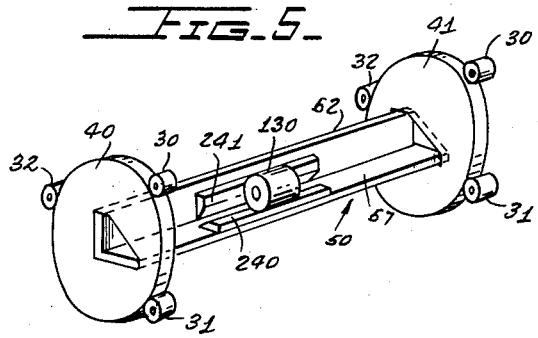
Figure 5 is a schematic perspective showing the manner in which the stator is supported on the carriage.

Referring to Figure 1, the machine as a whole is mounted on the base plate 10, and all operations are controlled by the motor 11 mounted on the base plate 10 and connected to the shaft 12 through any appropriate gear reducing mechanism in order that the rate of movement of the various elements may be at the desired speed.

An additional base plate 15 carrying the guide tracks 16 and the side frame members 17 is secured to the base plate 10 in any appropriate manner as by the angle members 19 and bolts 20. The side plates 17 are stationary members.

The stator carriage 25 comprises the pair of side plates 26 and 27 connected together at their lower ends by the slide rails 28. Appropriate additional interconnecting or bracing elements may be provided for the carriage plates 26 and 27 so that they will move together. These may consist of additional cross-bars paralleling the rails 28. The plates 26 and 27 are each provided on the interior surface thereof facing the opposite plate with a plurality of rollers 30, 31, and 32 appropriately and rotatably secured on the studs 35 carried in appropriate openings in the plates 26 and 27, respectively, and secured therein in any suitable manner as, for instance, by the nuts 37 over threaded extensions of the studs 35.

The rollers 30, 31 and 32 on each side may rotate freely on their studs 35. A pair of circular plates 40 and 41 is mounted on each side between the rollers 30, 31 and 32 on each side, the said plates being free to rotate while being supported by the rollers 30, 31 and 32. These plates are integrated or interconnected for simultaneous operation in any suitable manner as, for instance, by the cross bars 44 and 45 extending between them.

The plates are also interconnected by the longitudinal angle member 50 comprising the panels 51 and 52 at right angles to each other and extending through appropriate trapezoidal openings 54 and 55 of the rotating members 40 and 41.

The motor shaft 12 carries the gear 60 which meshes with the crank gear 61 appropriately supported on the stand 62. Crank pin 63 on crank gear 61 extends into slot 64 of the draw link 65. Rotation of gears 60 and 61 results in corresponding rotation of crank pin 63 and thereby results in corresponding oscillatory movement of the draw link 65.

The opposite end of draw link 65 is connected by the clevis 66 to plate 26 of the carriage. The oscillatory movement of draw ling 65 is thereby translated into corresponding oscillatory movement of the carriage 25 and the carriage thereby moves back and forth with its rails 28 moving in the guides 16. The slot 64 in the draw link 65 ensures that the carriage 25 will come to a stop at the end of each translatory movement thereof and there remain in the halted position while the crank pin 63 moves from one end of the slot 64 to the other end of the slot 64 to reverse the movement.

This consequently will provide the necessary time for angular rotation of the stator after it has been drawn in a translatory manner.

The draw link 65 extends through the slot 68 in frame plate 17, the slot 68 being sufficiently wide to permit free movement of the link 65 to accomplish the translatory motion above-mentioned together with a halt or stop at the end of each translatory movement.

Stops 70 backed by compression spring 71 are provided at the ends of slot 64 to permit some freedom of adjustment during the movement of the carriage and particularly to permit the crank pin 63 to have the necessary additional movement to complete its rotation after the angular driving means hereinafter described have been engaged and further to permit the full engagement of the angular driving means.

The hollow shaft 100 which carries the wires 101, 102–112 is stationarily supported by the bracket 120 carried by the right-hand plate 17 and slidably extends through an appropriate opening in carriage plate 27 to approximately the center of the carriage 25 where it terminates in a plurality of needles 130. Each of the needles communicates with the center of hollow shaft 100 having an appropriate passage 131 therefor.

As shown in Figures 2 and 3, each of the needles is in threaded engagement with the hollow shaft 100, and the end of the hollow shaft 100 at the center of the carriage is provided with a plurality of slots 135 into which the wires 101 to 112 may individually be placed.

Thus, to thread the needle 130 in the simplest possible manner, the needle 130 is removed from the hollow shaft 100 by rotation thereof out of screw threaded engagement. Wires 101 to 112 or any of them are drawn through the center of hollow shaft 100 and bent up with one wire in each of the slots 135. The needle 130 is then passed down over the end of the wire to the outer periphery of the hollow shaft 100 and is screwed in.

Thus, thereafter appropriate tensioning means will maintain the wire in the slot 135 as it moves out through the opening in needle 130.

A plurality of fingers 150 each individual to a slot of the stator to be wound is carried on the hollow tube 100 so that it is stationary longitudinally with respect to the tube 100 but being rotatable with respect to the same. The fingers 150 are interconnected by the ring 152. Ring 152 has an extension 153 terminating in a bracket 154 slidably engaging the cross rod 45 so that the fingers 150 will rotate with the carriage 25 although they will not have translatory movement therewith.

Figure 7:
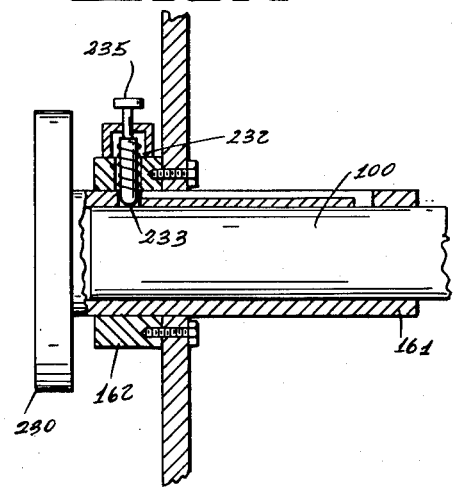
Figure 7 is a cross-sectional view taken on line 7—7 of Figure 1 looking in the direction of the arrows showing the manner in which one set of fingers is made displaceable so that the stator may be mounted on and removed from the carriage.
Figure 8:
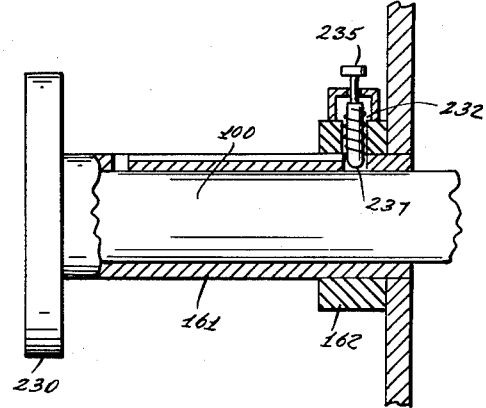
Figure 8 is a view corresponding to that of Figure 7 showing the fingers displaced.

An additional set of fingers 160 is secured on a shaft 161 which is mounted in the bearing 162 carried by the plate 17 (see Figures 7 and 8). This set of fingers is also provided with the support ring 162a and the upwardly extending arm terminating in bracket 164 engaging bracing bar 45 between the rotatable plates 40 and 41 so that the fingers will rotate with the carriage but will remain stationary while the carriage moves longitudinally.

Thus, the brackets 154 and 164 are not secured to the cross bar 55 but slide along the said cross bar and actually are bifurcated members engaging both sides thereof to ensure that this sliding action will take place and further to ensure that rotation will take place when required. The shaft 161 is rotatable in the bearing 162 and thus the fingers 160 may rotate angularly with the carriage 25 although they are fixed longitudinally.

Therefore, as the carriage moves back and forth translatorily under the operation of the link 65, the fingers 150 and 160 remain stationary so that the stator 130 slides over the gap 180 between the fingers in which the needles 131 are located from one side to the other of this gap as shown in the solid and dotted lines of Figure 3.

The fingers 150 or 160, as the case may be, register in the slots 181 of the stator 130 as shown in Figure 4, support the stator, and provide a form around which the coils of wire may be wound as well as providing free space on either side of the fingers within the slots 181 in which the wire may be drawn through the slots to form the coil.

A shaft 200 is provided having a spur gear 201 meshing with the gear 202 secured in any suitable manner to the rotatable plate 40. Rotation of shaft 200 and of spur gear 201, therefore, rotates the gear 202 and the plate 40 to which it is attached; and through the connecting bars 44 and 45 also rotates the opposite plate 41 so that the carriage rotates in response to the action of the spur gear 201 and shaft 200 in addition to moving longitudinally or translatorily.

As previously pointed out, the stator starts on one set of fingers, is moved by the movement of the carriage longitudinally onto the other set of fingers drawing the wire through the slots.

The stator is then rotated pulling the wires around the fingers which then act as forms. The stator is then moved longitudinally in a reverse direction drawing the wire through angularly displaced slots and then the carriage is once more rotated angularly in an opposite direction to complete the loop and to place the stator in a position to start another set of duplicate loops.

The shaft 200 and spur gear 201 serve the function of providing the angular rotation for a limited angle. The shaft 200 is carried by the plate 26 and moves back and forth on the plate 26. The shaft 200 is rotatable and slidable in the bearing 220 in stationary plate 17 and thus the shaft 200 moves back and forth translatorily with the carriage 25.

At the limit of movement of the carriage 25 to the right, bevel gear 222 on shaft 200 engages bevel gear 223 on the drive shaft 12 so that the bevel gear 222 is rotated thereby, thereby rotating the shaft 200 and the spur gear 201 and thereby rotating the carriage 25 while the needles 131 remain stationary.

On the initiation of the return movement of the carriage, the disengagement of bevel gear 222 from bevel gear 223 owing to the movement of shaft 200 with the carriage halts the angular rotation and now the wires are drawn directly through the slots since the only movement of the carriage is translatory.

On completion of this translatory movement, bevel gear 225' of shaft 200 engages the driving bevel gear 223 once more to cause angular rotation of the carriage. Since the opposite side of the bevel bear 223 is thereby engaged, the angular rotation is in a reverse direction.

The crank gear 61 and its pin 63 are so proportioned with respect to the distance between bevel gears 222 and 225 and particularly the length of the slot 64 in link 65 is so proportioned that rotation of bevel gears 222 and 225, as the case may be, will occur for a 90° angle in the example selected for the present description while the crank pin 63 is travelling from one end to the other of slot 64.

The length of the slot may be adjusted in use by appropriate adjustment of the stops 70 at the ends of the slot 64 in link 65 and the springs 71 which ensure that the teeth of bevel gears 222, 223 or 225, as the case may be, will mesh appropriately.

Figure 6:
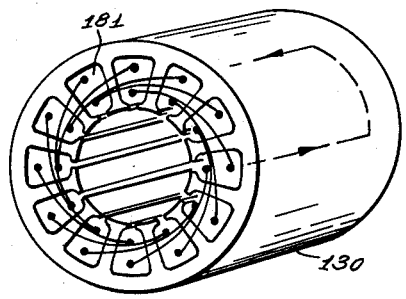
Figure 6 is a schematic perspective showing the manner in which one set of turns is interleaved.

By this means, therefore, the stator is drawn back and forth across the needles from one set of fingers to the other and is rotated 90° in one direction at the end of one translatory movement and 90° in a reverse direction at the end of the next translatory movement so that by repetition of these movements successive turns of all of the wire loops may be formed to produce an interlaced set of symmetrical coils of the general type shown schematically in Figure 6.

In Figure 6 the first set of turns is shown wound on stator 130. The next set of turns will be a repetition of the first set of turns and the third set of turns will also be a repetition. This series of windings will be repeated until the proper number of turns is built up for each coil, at which time all of the coils will be interlaced and symmetrically arranged.

It is necessary to arrange the carriage so that the stator may be secured thereto and also so that the stator may readily be removed therefrom. In order to provide means for placing the stator on the carriage and removing the same from the carriage, I have arranged one of my sets of fingers 160 as shown in Figures 1, 7 and 8 so that they may be withdrawn longitudinally to provide a sufficient gap for introducing the stator into the carriage.

Thus, the shaft 161 may be pulled to the left as shown by a comparison of Figures 7 and 8. The shaft 161 carrying the fingers 160 is mounted as previously pointed out in the bearing 162 and has at its left-hand end the knob 230. The shaft 161 is fixed longitudinally by the spring biased pin 232 engaging in the annular groove 233 of the shaft 161. The groove is an annular groove to permit the fingers 160 under shaft 161 to rotate angularly as previously described, but it does not permit longitudinal movement of the shaft 161 or the fingers 160.

Consequently, the movement of the carriage 25 causes the stator to move back and forth with respect to the fingers.

When it is desired to place a stator on the carriage, the spring pin 232 is lifted up by its knob 235 and the knob 230 is pulled out to the left, pulling the shaft 161 and fingers 16 to the left and away from the needles 130. The stator may then be placed in this gap and slid onto the ends of the fingers 160. The fingers 160 may during this operation be withheld in the withdrawn position by the fact that as shown in Figure 8 spring pin 232 engages in the second annular groove 237 on shaft 161.

When the stator must be placed in position on either set of fingers, the spring pin 232 is now lifted by its knob 235 and knob 230 is pushed to the left until the spring finger 232 clicks into the annular groove 233. This locks the stator on the carriage by causing the fingers 150 or 160, as the case may be, to enter the slots 181 of the stator 130 and thereby integrates the stator 130 with the carriage so that it will have rotational movement therewith.

In addition, the angle plate 50 and its panels 51 and 52 are each provided with the friction retaining pads 240, 241 which engage the stator tightly as shown in Figure 5 and ensure that the stator will move longitudinally with the carriage.

Before the stator is placed in position and while the fingers 160 are drawn to the left creating an additional gap, the wires 101 to 112 have been inserted down through the hollow tube 100 so that they emerge from the left end thereof, the needles 130 have been unscrewed from the left end of the tube 100, the end of each wire is pulled up into the slot 135, the needle 130 is passed down with its opening 131 sliding down over the end of the wire and the needle 130 is then screwed into the left-hand end of the hollow tube 100.

The stator is now inserted on the fingers 160. The wire ends from each of the needles 130 are each secured to the stator at the appropriate location to register with the appropriate slots. With the return of the fingers 160 to their proper position as previously described, the stator is now ready to be wound.

The spools or other source of supply for the wire are appropriately tensioned so that the wire will be drawn straight and taut and not have undesired kinks or loops therein, and the operation proceeds by alternating translatory movements with angular movements, the translatory movement in one direction being followed by an angular movement in one direction, and this angular movement then being followed by a translatory movement in an opposite direction with an angular movement in an opposite direction, the process thereafter being repeated until the desired number of turns of interleaved symmetrical coils has been achieved.

On completion of the stator, the fingers 160 are drawn to the left as previously described, the stator is removed and the wire ends extending from the loops to the needles are cut and the wire ends appropriately treated to complete the stator. A second stator is mounted in position and the wire ends now extending from the needles secured thereto.

When the wire supply for any one wire is exhausted, that one wire may be rethreaded through the needle in a manner previously described, or it may be secured to the trailing end of the exhausted wire and pulled through the needle, care being taken, however, that no wire supply will be exhausted during the actual process of winding the stator in order to maintain the desired symmetry in the stator.

By this means, therefore, a simplified method and apparatus is provided for automatically winding the stator with a plurality of symmetrical interlaced loops so arranged that the difficulties and asymmetry of hand operation are obviated and the advantages of perfect symmetry arising from the interlacing of the turns of each coil are obtained in addition to the advantage of smooth continuous precision winding.

In the foregoing I have described my invention solely in connection with specific illustrative embodiments thereof. Since many variations and modifications of my invention will now be obvious to those skilled in the art, I prefer to be bound not by the specific disclosures herein contained but only by the appended claims.

I claim:

1. A machine for winding the stator of a motor, said stator comprising a hollow cylindrical form having a plurality of longitudinal slots in the inner surface thereof to receive portions of coils; said machine comprising a carriage for supporting said stator; said carriage comprising a pair of angularly related members receiving and releasably retaining said stator at the outer periphery of said stator; said members extending in planes parallel to the longitudinal axis of said stator; said carriage with said stator being movable by translation in a direction parallel to the axis of the stator; said carriage being rotatable about the axis of the stator to rotate said stator; a plurality of stationary needles extending radially of said stator; said needles slidably positioning wires to be drawn therethrough; a plurality of longitudinally stationary fingers engageable with said slots; said fingers being rotatable with said carriage but being longitudinally stationary as said carriage moves translatorily; the translatory movement of said carriage moving said stator alternately from one side to the other of said needles and drawing said wires from said needles through the interior of said stator form; said carriage rotating through a limited arc at the end of each translatory movement; and rotating in an opposite direction through the same arc at the end of the successive translatory movement.

2. A machine for winding the stator of a motor, said stator comprising a hollow cylindrical form having a plurality of longitudinal slots in the inner surface thereof to receive portions of coils; said machine comprising a carriage for supporting said stator; said carriage comprising a pair of angularly related members receiving and releasably retaining said stator at the outer periphery of said stator; said members extending in planes parallel to the longitudinal axis of said stator; said carriage with said stator being movable by translation in a direction parallel to the axis of the stator; said carriage being rotatable about the axis of the stator to rotate said stator; a plurality of stationary needles extending radially of said stator; said needles slidably positioning wires to be drawn therethrough; a plurality of longitudinally stationary fingers engageable with said slots; said fingers being rotatable with said carriage but being longitudinally stationary as said carriage moves translatorily; the translatory movement of said carriage moving said stator alternately from one side to the other of said needles; said carriage rotating through a limited arc at the end of each translatory movement; and rotating in an opposite direction through the same arc at the end of the successive translatory movement; said stator in its translatory movement in one direction drawing the wires through the slots in the interior of said stator form; said stator in its rotation in one direction at the end of a translatory movement drawing the wires circumferentially; said stator in its return translatory movement drawing the wires through angularly displaced slots; said stator on completion of its return rotation placing the wires opposite the original slots to complete a loop; said slots forming forms for the longitudinal courses of each loop.

References Cited in the file of this patent

UNITED STATES PATENTS

| | | |
|---|---|---|
| 2,381,750 | Hunsdorf | Aug. 7, 1945 |
| 2,561,562 | Collins | July 24, 1951 |
| 2,568,945 | Burdulis | Sept. 25, 1951 |
| 2,569,679 | Leece et al. | Oct. 2, 1951 |
| 2,594,707 | Allen | Apr. 29, 1952 |
| 2,624,518 | Scofield et al. | Jan. 6, 1953 |
| 2,647,696 | Brunand | Aug. 4, 1953 |

FOREIGN PATENTS

| | | |
|---|---|---|
| 633,915 | Great Britain | Dec. 30, 1949 |